United States Patent
Ruckart

(10) Patent No.: US 7,295,656 B2
(45) Date of Patent: *Nov. 13, 2007

(54) AUDIO CALLER IDENTIFICATION

(75) Inventor: John Ruckart, Atlanta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/294,294

(22) Filed: Dec. 5, 2005

(65) Prior Publication Data

US 2006/0072719 A1 Apr. 6, 2006

Related U.S. Application Data

(63) Continuation of application No. 09/888,926, filed on Jun. 25, 2001, now Pat. No. 7,012,999.

(51) Int. Cl.
H04M 1/64 (2006.01)

(52) U.S. Cl. ............... 379/88.21; 379/142.06; 455/563

(58) Field of Classification Search ........... 379/88.21, 379/93.23, 142.01, 142.06; 455/563
See application file for complete search history.

(56) References Cited

U.S. PATENT DOCUMENTS

| | | | |
|---|---|---|---|
| 4,266,098 A | 5/1981 | Novak | |
| 4,268,722 A | 5/1981 | Little et al. | |
| 4,277,649 A | 7/1981 | Sheinbein | |
| 4,582,956 A | 4/1986 | Doughty | |
| 4,649,433 A | 3/1987 | Verhoeven | |
| 4,649,533 A | 3/1987 | Chorley et al. | |
| 4,663,777 A | 5/1987 | Szeto | |
| 4,698,839 A | 10/1987 | DeVaney et al. | |
| 4,791,664 A | 12/1988 | Lutz et al. | |
| 4,797,911 A | 1/1989 | Szlam et al. | |
| 4,802,202 A | 1/1989 | Takahashi et al. | |
| 4,817,133 A | 3/1989 | Takahashi et al. | |
| 4,823,304 A | 4/1989 | Frantz et al. | |

(Continued)

FOREIGN PATENT DOCUMENTS

EP 0 821 511 A2 1/1998

(Continued)

OTHER PUBLICATIONS

Copending U.S. Appl. No. 09/888,926, filed Jun. 25, 2002, entitled "Audio Caller Identification".

(Continued)

*Primary Examiner*—Gerald Gauthier
(74) *Attorney, Agent, or Firm*—Cantor Colburn LLP

(57) ABSTRACT

An audio caller identification system and method are provided. A caller identification device of a called party's telephone, whether integrated with the telephone or stand-alone, includes a speaker for audibly alerting the called party to the nature of an incoming call. A speech synthesizer in concert with an audio caller ID program may audibly identify a name and/or number of the calling party displayed on the called party's caller ID device, including descriptive terms for calling parties such as "private," "unlisted," or "out of the area." When the called party's telephone begins to ring, the called party may listen to the audio identification of the calling party for a quick screening without having to go to the telephone to read the caller ID.

14 Claims, 3 Drawing Sheets

U.S. PATENT DOCUMENTS

| | | | |
|---|---|---|---|
| 4,845,743 A | 7/1989 | Lutz | |
| 4,850,013 A | 7/1989 | Rose | |
| 4,850,103 A | 7/1989 | Takemoto et al. | |
| 4,995,075 A | 2/1991 | Angiolillo-Bent et al. | |
| 5,029,196 A | 7/1991 | Morganstein | |
| 5,109,405 A | 4/1992 | Morganstein | |
| 5,121,423 A | 6/1992 | Morihiro et al. | |
| 5,151,929 A | 9/1992 | Wolf | |
| 5,157,712 A | 10/1992 | Wallen, Jr. | |
| 5,161,181 A | 11/1992 | Zwick | |
| 5,200,994 A | 4/1993 | Sasano et al. | |
| 5,206,901 A | 4/1993 | Harlow et al. | |
| 5,260,987 A | 11/1993 | Mauger | |
| 5,263,084 A | 11/1993 | Chaput et al. | |
| 5,265,145 A | 11/1993 | Lim | 379/88.2 |
| 5,274,699 A | 12/1993 | Ranz | |
| 5,278,894 A | 1/1994 | Shaw | |
| 5,289,542 A | 2/1994 | Kessler | |
| 5,315,650 A | 5/1994 | Smith et al. | |
| 5,333,152 A | 7/1994 | Wilber | |
| 5,338,889 A | 8/1994 | Vora et al. | |
| 5,341,411 A | 8/1994 | Hashimoto | |
| 5,347,574 A | 9/1994 | Morganstein | |
| 5,361,295 A | 11/1994 | Solomon et al. | |
| 5,383,466 A | 1/1995 | Partika | |
| 5,386,460 A | 1/1995 | Boakes et al. | |
| 5,388,150 A | 2/1995 | Schneyer et al. | |
| 5,413,605 A | 5/1995 | Ashby et al. | |
| 5,420,910 A | 5/1995 | Rudokas et al. | |
| 5,420,914 A | 5/1995 | Blumhardt | |
| 5,420,920 A | 5/1995 | Capper et al. | |
| 5,425,089 A | 6/1995 | Chan et al. | |
| 5,430,719 A | 7/1995 | Weisser, Jr. | |
| 5,446,785 A | 8/1995 | Hirai | |
| 5,452,089 A | 9/1995 | Bushman | |
| 5,452,346 A | 9/1995 | Miyamoto | |
| 5,459,779 A | 10/1995 | Backaus et al. | |
| 5,466,785 A | 11/1995 | De Framond | |
| 5,467,388 A | 11/1995 | Redd, Jr. et al. | |
| 5,475,748 A | 12/1995 | Jones | |
| 5,481,594 A | 1/1996 | Shen et al. | |
| 5,481,599 A | 1/1996 | MacAllister et al. | 379/101 |
| 5,481,602 A | 1/1996 | Griffiths et al. | |
| 5,490,205 A | 2/1996 | Kondo et al. | |
| 5,497,414 A | 3/1996 | Bartholomew | |
| 5,502,762 A | 3/1996 | Andrew et al. | |
| 5,506,893 A | 4/1996 | Buscher et al. | |
| 5,511,111 A | 4/1996 | Serbetcioglu et al. | |
| 5,530,741 A | 6/1996 | Rubin | |
| 5,533,106 A | 7/1996 | Blumhardt | |
| 5,535,265 A | 7/1996 | Suwandhaputra | |
| 5,539,809 A | 7/1996 | Mayer | |
| 5,546,447 A | 8/1996 | Skarbo et al. | |
| 5,550,900 A | 8/1996 | Ensor et al. | |
| 5,550,905 A | 8/1996 | Silverman | |
| 5,563,935 A | 10/1996 | Small | |
| 5,563,936 A | 10/1996 | Washington | |
| 5,602,908 A | 2/1997 | Fan | |
| 5,608,788 A | 3/1997 | Demlow et al. | |
| 5,619,561 A | 4/1997 | Reese | |
| 5,631,950 A | 5/1997 | Brown | |
| 5,636,269 A | 6/1997 | Eisdorfer | |
| 5,644,629 A | 7/1997 | Chow | |
| 5,646,979 A * | 7/1997 | Knuth | 455/563 |
| 5,657,372 A | 8/1997 | Ahlberg et al. | |
| D383,466 S | 9/1997 | Burrell et al. | |
| 5,668,852 A | 9/1997 | Holmes | |
| 5,696,809 A | 12/1997 | Voit | |
| 5,696,815 A | 12/1997 | Smyk | |
| 5,699,523 A | 12/1997 | Li et al. | |
| 5,701,301 A | 12/1997 | Weisser, Jr. | |
| 5,703,934 A | 12/1997 | Zicker et al. | |
| 5,724,412 A | 3/1998 | Srinivasan | |
| 5,734,706 A | 3/1998 | Windsor et al. | |
| 5,754,635 A | 5/1998 | Kim | |
| 5,754,636 A | 5/1998 | Bayless et al. | |
| 5,754,775 A | 5/1998 | Adamson et al. | |
| 5,771,281 A | 6/1998 | Batten, Jr. | |
| 5,771,283 A | 6/1998 | Chang et al. | |
| 5,781,621 A | 7/1998 | Lim et al. | |
| 5,784,444 A | 7/1998 | Snyder et al. | |
| 5,796,806 A | 8/1998 | Birckbichler | |
| 5,799,072 A | 8/1998 | Vulcan et al. | |
| 5,802,160 A | 9/1998 | Kugell et al. | |
| 5,802,251 A | 9/1998 | Cohen et al. | |
| 5,805,587 A | 9/1998 | Norris et al. | |
| 5,805,682 A | 9/1998 | Voit et al. | |
| 5,805,997 A | 9/1998 | Farris | |
| 5,809,128 A | 9/1998 | McMullin | |
| 5,812,533 A | 9/1998 | Cox et al. | |
| 5,812,649 A | 9/1998 | Shen | |
| 5,838,774 A | 11/1998 | Weisser, Jr. | |
| 5,841,838 A | 11/1998 | Itoh et al. | |
| 5,841,850 A | 11/1998 | Fan | |
| 5,848,142 A | 12/1998 | Yaker | |
| 5,850,435 A | 12/1998 | Devillier | |
| 5,850,436 A | 12/1998 | Rosen et al. | |
| 5,857,017 A | 1/1999 | Ohi | |
| 5,859,903 A | 1/1999 | Lee | |
| 5,872,834 A | 2/1999 | Teitelbaum | |
| 5,872,934 A | 2/1999 | Whitehouse et al. | |
| 5,878,036 A | 3/1999 | Spartz et al. | |
| 5,883,942 A | 3/1999 | Lim et al. | |
| 5,884,144 A | 3/1999 | Chavez, Jr. et al. | |
| 5,894,504 A | 4/1999 | Alfred et al. | |
| 5,901,209 A | 5/1999 | Tannenbaum et al. | |
| 5,901,212 A | 5/1999 | True et al. | |
| 5,903,636 A | 5/1999 | Malik | |
| 5,905,794 A | 5/1999 | Gunn et al. | |
| 5,907,596 A | 5/1999 | Karnowski | |
| 5,907,604 A | 5/1999 | Hsu | |
| 5,915,000 A | 6/1999 | Nguyen et al. | |
| 5,917,817 A | 6/1999 | Dunn et al. | |
| 5,923,744 A | 7/1999 | Cheng et al. | |
| 5,930,701 A | 7/1999 | Skog | |
| 5,940,484 A | 8/1999 | DeFazio et al. | |
| 5,946,363 A | 8/1999 | Rominger et al. | |
| 5,946,636 A | 8/1999 | Uyeno et al. | |
| 5,946,684 A | 8/1999 | Lund | |
| D413,605 S | 9/1999 | Thomas | |
| 5,948,040 A | 9/1999 | DeLorme et al. | |
| 5,949,865 A | 9/1999 | Fusinato | |
| 5,953,399 A | 9/1999 | Farris et al. | |
| 5,953,657 A | 9/1999 | Ghisler | |
| 5,963,626 A | 10/1999 | Nabkel | 379/88.2 |
| 5,969,647 A | 10/1999 | Mou et al. | |
| 5,970,127 A | 10/1999 | Smith et al. | |
| 5,970,128 A | 10/1999 | Kim | |
| 5,974,309 A | 10/1999 | Foti | |
| 5,982,866 A | 11/1999 | Kowalski | |
| 5,991,377 A | 11/1999 | Malik | |
| 5,999,207 A | 12/1999 | Rodriquez et al. | |
| 5,999,599 A * | 12/1999 | Shaffer et al. | 379/93.23 |
| 5,999,613 A | 12/1999 | Nabkel et al. | 379/142.04 |
| 6,006,087 A | 12/1999 | Amin | |
| 6,009,321 A | 12/1999 | Wang et al. | |
| 6,014,559 A | 1/2000 | Amin | |
| 6,016,512 A | 1/2000 | Huitema | |
| 6,021,188 A | 2/2000 | Meg | |
| 6,021,427 A | 2/2000 | Spagna et al. | |
| 6,031,899 A | 2/2000 | Wu | 379/142.01 |
| 6,044,148 A | 3/2000 | Bleile | |
| 6,049,291 A | 4/2000 | Kikinis | |
| 6,058,171 A | 5/2000 | Hoopes | |

| Patent | Kind | Date | Inventor |
|---|---|---|---|
| 6,061,434 | A | 5/2000 | Corbett |
| 6,061,566 | A | 5/2000 | Friman |
| 6,064,876 | A | 5/2000 | Ishida et al. |
| 6,065,844 | A | 5/2000 | Chen ............................ 359/857 |
| 6,072,859 | A | 6/2000 | Kong |
| 6,078,581 | A | 6/2000 | Shtivelman et al. |
| 6,091,947 | A | 7/2000 | Sumner et al. |
| 6,094,478 | A | 7/2000 | Shepherd et al. |
| 6,094,573 | A | 7/2000 | Heinonen et al. |
| 6,094,574 | A | 7/2000 | Vance et al. |
| 6,094,575 | A | 7/2000 | Anderson et al. |
| 6,101,246 | A | 8/2000 | Heinmiller et al. |
| 6,104,784 | A | 8/2000 | Robbins et al. |
| 6,104,800 | A | 8/2000 | Benson |
| 6,108,630 | A | 8/2000 | Kuechler et al. |
| 6,111,939 | A | 8/2000 | Brabanec |
| 6,134,235 | A | 10/2000 | Goldman et al. |
| 6,134,311 | A | 10/2000 | Ekstrom |
| 6,137,870 | A | 10/2000 | Scherer |
| 6,137,871 | A | 10/2000 | Maier et al. |
| 6,141,341 | A | 10/2000 | Jones et al. |
| 6,141,409 | A | 10/2000 | Madoch et al. |
| 6,144,644 | A | 11/2000 | Bajzath et al. |
| 6,154,531 | A | 11/2000 | Clapper |
| 6,160,876 | A | 12/2000 | Moss et al. |
| 6,161,021 | A | 12/2000 | Akpa |
| 6,163,595 | A | 12/2000 | Parker et al. |
| 6,163,691 | A | 12/2000 | Buettner et al. |
| 6,167,254 | A | 12/2000 | Chavez, Jr. et al. |
| 6,173,049 | B1 | 1/2001 | Malik |
| 6,178,232 | B1 | 1/2001 | Latter et al. |
| 6,181,928 | B1 | 1/2001 | Moon |
| D437,879 | S | 2/2001 | Weinandt |
| 6,185,289 | B1 | 2/2001 | Hetz et al. |
| 6,185,426 | B1 | 2/2001 | Alperovich |
| 6,192,115 | B1 | 2/2001 | Toy et al. |
| 6,192,116 | B1 | 2/2001 | Mayak |
| 6,198,480 | B1 | 3/2001 | Cotugno et al. |
| 6,198,920 | B1 | 3/2001 | Doviak et al. |
| 6,202,023 | B1 | 3/2001 | Hancock et al. |
| 6,219,407 | B1 | 4/2001 | Kanevsky et al. |
| 6,226,367 | B1 | 5/2001 | Smith et al. |
| 6,226,369 | B1 | 5/2001 | Lim et al. |
| 6,230,006 | B1 | 5/2001 | Keenan et al. |
| 6,233,325 | B1 | 5/2001 | Frech et al. |
| 6,236,975 | B1 | 5/2001 | Boe et al. |
| 6,243,448 | B1 | 6/2001 | Corbett et al. |
| 6,243,461 | B1 | 6/2001 | Hwang |
| 6,266,399 | B1 | 7/2001 | Weller et al. |
| 6,278,704 | B1 | 8/2001 | Creamer et al. |
| 6,278,862 | B1 | 8/2001 | Henderson |
| 6,282,275 | B1 | 8/2001 | Gurbani et al. |
| 6,292,479 | B1 | 9/2001 | Bartholomew et al. |
| 6,292,549 | B1 | 9/2001 | Lung et al. |
| 6,295,502 | B1 | 9/2001 | Hancock et al. |
| 6,301,350 | B1 | 10/2001 | Henningson et al. |
| 6,304,644 | B2 | 10/2001 | Karnowski |
| 6,310,943 | B1 | 10/2001 | Kowalski |
| 6,311,057 | B1 | 10/2001 | Barvesten |
| 6,317,488 | B1 | 11/2001 | DePond et al. |
| 6,317,781 | B1 | 11/2001 | De Boor et al. |
| 6,324,263 | B1 | 11/2001 | Sherwood et al. |
| 6,324,271 | B1 | 11/2001 | Sawyer et al. |
| 6,327,347 | B1 | 12/2001 | Gutzmann ................ 379/88.2 |
| 6,332,021 | B2 | 12/2001 | Latter et al. |
| 6,333,973 | B1 | 12/2001 | Smith et al. |
| 6,337,979 | B1 | 1/2002 | Nakayasu |
| 6,339,639 | B1 | 1/2002 | Henderson |
| 6,341,161 | B1 | 1/2002 | Latter et al. |
| 6,345,187 | B1 | 2/2002 | Berthoud et al. |
| 6,347,136 | B1 | 2/2002 | Horan ........................ 379/88.2 |
| 6,351,637 | B1 | 2/2002 | Lee |
| 6,353,664 | B1 | 3/2002 | Cannon et al. |
| 6,361,637 | B2 | 3/2002 | Martin et al. |
| 6,363,411 | B1 | 3/2002 | Dugan et al. |
| 6,363,664 | B1 | 4/2002 | Brutsaert |
| 6,366,661 | B1 | 4/2002 | Devillier et al. |
| 6,366,772 | B1 | 4/2002 | Arnson |
| 6,377,807 | B1 | 4/2002 | Iparrea et al. |
| 6,377,979 | B1 | 4/2002 | Yamashita et al. |
| 6,389,124 | B1 | 5/2002 | Schnarel et al. ........ 379/142.01 |
| 6,400,809 | B1 | 6/2002 | Bossemeyer, Jr. et al. ...................... 379/88.21 |
| 6,400,947 | B1 | 6/2002 | Bright et al. |
| 6,404,868 | B1 | 6/2002 | Beamish et al. |
| 6,404,875 | B2 | 6/2002 | Malik et al. |
| 6,411,692 | B1 | 6/2002 | Scherer |
| 6,421,425 | B1 | 7/2002 | Bossi et al. |
| 6,422,263 | B1 | 7/2002 | Spicer |
| 6,427,003 | B1 | 7/2002 | Corbett et al. |
| 6,427,064 | B1 | 7/2002 | Henderson |
| 6,434,394 | B1 | 8/2002 | Grundvig et al. |
| 6,437,879 | B1 | 8/2002 | Temple |
| 6,438,216 | B1 | 8/2002 | Aktas |
| 6,438,584 | B1 | 8/2002 | Powers |
| 6,442,249 | B1 | 8/2002 | Miller, Jr. |
| 6,442,262 | B1 | 8/2002 | Moss et al. |
| 6,442,263 | B1 | 8/2002 | Beaton et al. |
| 6,442,283 | B1 | 8/2002 | Tewfik et al. |
| 6,445,781 | B1 | 9/2002 | Heinmiller et al. |
| 6,449,351 | B1 | 9/2002 | Moss et al. |
| 6,449,361 | B1 | 9/2002 | Okuda |
| 6,462,646 | B1 | 10/2002 | Helferich |
| 6,466,653 | B1 | 10/2002 | Hamrick et al. |
| 6,477,246 | B1 | 11/2002 | Dolan et al. |
| 6,480,589 | B1 | 11/2002 | Lee et al. |
| 6,483,898 | B2 | 11/2002 | Lew et al. |
| 6,493,430 | B2 | 12/2002 | Leuca et al. |
| 6,493,431 | B1 | 12/2002 | Troen-Krasnow et al. |
| 6,493,437 | B1 | 12/2002 | Olshansky |
| 6,493,439 | B2 | 12/2002 | Lung et al. |
| 6,494,953 | B2 | 12/2002 | Hayes et al. |
| 6,496,569 | B2 | 12/2002 | Pelletier et al. |
| 6,496,571 | B1 | 12/2002 | Wilson |
| 6,496,692 | B1 | 12/2002 | Shanahan |
| 6,498,841 | B2 | 12/2002 | Bull et al. |
| 6,507,737 | B1 | 1/2003 | Laham et al. |
| 6,529,500 | B1 | 3/2003 | Pandharipande |
| 6,529,591 | B1 | 3/2003 | Dosani et al. |
| 6,532,490 | B1 | 3/2003 | Lewis et al. |
| 6,539,080 | B1 | 3/2003 | Bruce et al. |
| 6,542,583 | B1 | 4/2003 | Taylor |
| 6,542,586 | B1 | 4/2003 | Helstab |
| 6,542,591 | B1 | 4/2003 | Amro et al. |
| 6,542,602 | B1 | 4/2003 | Elazar |
| 6,542,812 | B1 | 4/2003 | Obradovich et al. |
| 6,546,092 | B2 | 4/2003 | Corbett et al. |
| 6,549,621 | B1 | 4/2003 | Christie, IV et al. |
| 6,553,110 | B1 | 4/2003 | Peng |
| 6,553,221 | B2 | 4/2003 | Nakamura et al. |
| 6,556,540 | B1 | 4/2003 | Mawhinney et al. |
| 6,560,317 | B1 | 5/2003 | Quagliana |
| 6,560,327 | B1 | 5/2003 | McConnell |
| 6,566,995 | B2 | 5/2003 | Furuuchi et al. |
| 6,570,971 | B2 | 5/2003 | Latter et al. |
| 6,570,974 | B1 | 5/2003 | Gerszberg et al. |
| 6,574,319 | B2 | 6/2003 | Latter et al. |
| 6,580,904 | B2 | 6/2003 | Cox et al. |
| 6,584,490 | B1 | 6/2003 | Schuster et al. |
| 6,587,458 | B1 | 7/2003 | Burg et al. |
| 6,597,905 | B1 | 7/2003 | Hijii |
| 6,603,840 | B2 | 8/2003 | Fellingham et al. |
| 6,608,891 | B1 | 8/2003 | Pelletier et al. ........ 379/207.02 |
| 6,618,474 | B1 | 9/2003 | Reese |
| 6,625,595 | B1 | 9/2003 | Anderson et al. |
| 6,631,181 | B1 | 10/2003 | Bates et al. |

| | | |
|---|---|---|
| 6,633,633 B1 | 10/2003 | Bedingfield |
| 6,639,979 B1 | 10/2003 | Kim |
| 6,650,743 B2 | 11/2003 | Heinmiller et al. |
| 6,659,597 B2 | 12/2003 | Murata et al. |
| 6,661,785 B1 | 12/2003 | Zhang et al. |
| 6,665,388 B2 | 12/2003 | Bedingfield |
| 6,683,870 B1 | 1/2004 | Archer |
| 6,687,341 B1 | 2/2004 | Koch et al. |
| 6,697,357 B2 | 2/2004 | Emerson, III |
| 6,701,160 B1 | 3/2004 | Pinder et al. |
| 6,718,021 B2 | 4/2004 | Crockett et al. |
| 6,721,407 B1 | 4/2004 | Michelena |
| 6,724,872 B1 | 4/2004 | Moore et al. |
| 6,725,872 B2 | 4/2004 | Kindell et al. |
| 6,728,355 B2 | 4/2004 | Kowalski |
| 6,728,360 B1 | 4/2004 | Brennan |
| 6,728,365 B1 | 4/2004 | Li et al. |
| 6,731,727 B2 | 5/2004 | Corbett et al. |
| 6,732,188 B1 | 5/2004 | Flockhart et al. |
| 6,738,615 B1 | 5/2004 | Chow et al. |
| 6,748,058 B1 | 6/2004 | Schwend et al. |
| 6,748,068 B1 | 6/2004 | Walsh et al. |
| 6,751,457 B1 | 6/2004 | Martin |
| 6,757,274 B1 | 6/2004 | Bedingfield et al. |
| 6,757,530 B2 | 6/2004 | Rouse et al. |
| 6,757,740 B1 | 6/2004 | Parekh et al. |
| 6,760,413 B2 | 7/2004 | Cannon et al. |
| 6,765,998 B2 | 7/2004 | Bruce et al. |
| 6,766,003 B2 | 7/2004 | Moss et al. |
| 6,768,792 B2 | 7/2004 | Brown et al. |
| D494,953 S | 8/2004 | Leung |
| 6,771,754 B2 | 8/2004 | Pelletier et al. |
| 6,771,755 B1 | 8/2004 | Simpson |
| 6,771,956 B1 | 8/2004 | Beeler |
| 6,775,366 B1 | 8/2004 | Cobbett et al. |
| 6,775,371 B2 | 8/2004 | Elsey et al. |
| 6,775,540 B2 | 8/2004 | Iyer |
| 6,778,524 B1 | 8/2004 | Augart |
| 6,779,020 B1 | 8/2004 | Henrick |
| 6,785,301 B1 | 8/2004 | Chapman et al. |
| 6,785,368 B1 | 8/2004 | Eason et al. |
| 6,785,540 B1 | 8/2004 | Wichelman |
| 6,792,266 B1 | 9/2004 | Masuda et al. |
| 6,798,841 B1 | 9/2004 | Hansen |
| 6,798,879 B1 | 9/2004 | Beham |
| 6,804,503 B2 | 10/2004 | Shohara et al. |
| 6,807,267 B2 | 10/2004 | Moss et al. |
| 6,810,077 B1 | 10/2004 | Dezonno |
| 6,810,115 B2 | 10/2004 | Fukuda |
| 6,813,344 B1 | 11/2004 | Lemke |
| 6,816,481 B1 | 11/2004 | Adams et al. |
| 6,818,474 B2 | 11/2004 | Kim et al. |
| 6,826,271 B1 | 11/2004 | Kanabar et al. |
| 6,830,595 B2 | 12/2004 | Reynolds, III |
| 6,831,974 B1 | 12/2004 | Watson et al. |
| 6,842,512 B2 | 1/2005 | Pedersen |
| 6,845,151 B2 | 1/2005 | Peng |
| 6,845,512 B2 | 1/2005 | Horng et al. |
| 6,853,710 B2 | 2/2005 | Harris |
| 6,853,711 B2 | 2/2005 | Brisebois et al. |
| 6,856,677 B2 | 2/2005 | Leijonhufvud |
| 6,859,527 B1 | 2/2005 | Banks et al. |
| 6,865,266 B1 | 3/2005 | Pershan |
| 6,868,155 B1 | 3/2005 | Cannon et al. |
| 6,871,076 B2 | 3/2005 | Samn |
| 6,888,927 B1 | 5/2005 | Cruickshank et al. |
| 6,888,972 B2 | 5/2005 | Berg et al. |
| 6,898,275 B2 | 5/2005 | Dolan et al. |
| 6,904,137 B2 | 6/2005 | Brandt et al. |
| 6,904,276 B1 | 6/2005 | Freeman et al. |
| 6,907,034 B1 | 6/2005 | Begis |
| 6,909,777 B2 | 6/2005 | Latter et al. |
| 6,914,953 B2 | 7/2005 | Boerstler |
| 6,922,411 B1 | 7/2005 | Taylor |
| 6,928,154 B1 | 8/2005 | Cheaito et al. |
| 6,931,007 B2 | 8/2005 | Jones |
| 6,952,469 B2 | 10/2005 | Han |
| 6,970,546 B2 | 11/2005 | Kent, Jr. et al. |
| 6,977,993 B2 | 12/2005 | Starbuck et al. |
| 6,996,211 B2 | 2/2006 | Reynolds et al. |
| 7,016,482 B2 | 3/2006 | Moss et al. |
| 7,027,408 B2 | 4/2006 | Nabkel et al. |
| 7,076,051 B2 | 7/2006 | Brown et al. |
| 7,079,837 B1 | 7/2006 | Sherman et al. |
| 7,095,715 B2 | 8/2006 | Buckman et al. |
| 7,097,169 B2 | 8/2006 | Mueller |
| 7,103,167 B2 | 9/2006 | Brahm et al. |
| 7,103,662 B2 | 9/2006 | Ray et al. |
| 7,107,077 B2 | 9/2006 | Lee |
| 7,113,577 B2 | 9/2006 | Cook et al. |
| 7,127,488 B1 | 10/2006 | Scott et al. |
| 7,139,374 B1 | 11/2006 | Scott et al. |
| 7,152,118 B2 | 12/2006 | Anderson, IV et al. |
| 7,155,211 B2 | 12/2006 | Mun et al. |
| 2001/0005854 A1 | 6/2001 | Murata et al. |
| 2001/0044898 A1 | 11/2001 | Benussi et al. |
| 2002/0009184 A1 | 1/2002 | Shnier .................. 379/142.01 |
| 2002/0016748 A1 | 2/2002 | Emodi et al. .................. 705/26 |
| 2002/0041605 A1 | 4/2002 | Benussi et al. |
| 2002/0055926 A1 | 5/2002 | Dan et al. |
| 2002/0067816 A1 | 6/2002 | Bushnell |
| 2002/0077102 A1 | 6/2002 | Achuthan et al. |
| 2002/0082050 A1 | 6/2002 | Mountney et al. |
| 2002/0085687 A1 | 7/2002 | Contractor et al. |
| 2002/0118812 A1 | 8/2002 | Contractor |
| 2002/0119430 A1 | 8/2002 | Szynalski |
| 2002/0120629 A1 | 8/2002 | Leonard |
| 2002/0122401 A1 | 9/2002 | Xiang et al. |
| 2002/0125929 A1 | 9/2002 | Chen et al. |
| 2002/0183098 A1 | 12/2002 | Lee et al. .................. 455/566 |
| 2002/0188443 A1 | 12/2002 | Reddy et al. |
| 2002/0191755 A1 | 12/2002 | Lew et al. ................ 379/88.19 |
| 2003/0012353 A1 | 1/2003 | Tang |
| 2003/0016143 A1 | 1/2003 | Ghazarian |
| 2003/0016800 A1 | 1/2003 | Fukuda |
| 2003/0026416 A1 | 2/2003 | Fusco |
| 2003/0032414 A1 | 2/2003 | Melaku |
| 2003/0050100 A1 | 3/2003 | Dent |
| 2003/0053602 A1 | 3/2003 | Stuckman et al. |
| 2003/0063730 A1 | 4/2003 | Woodring |
| 2003/0063731 A1 | 4/2003 | Woodring |
| 2003/0092384 A1 | 5/2003 | Ross, III ..................... 455/41 |
| 2003/0095650 A1 | 5/2003 | Mize ....................... 379/88.19 |
| 2003/0112938 A1 | 6/2003 | Kanakubo et al. |
| 2003/0133553 A1 | 7/2003 | Kahkoo et al. |
| 2003/0133653 A1 | 7/2003 | De Barros et al. |
| 2003/0148758 A1 | 8/2003 | McMullin |
| 2003/0152207 A1 | 8/2003 | Ryan |
| 2003/0187949 A1 | 10/2003 | Bhatt et al. |
| 2003/0196206 A1 | 10/2003 | Shusman |
| 2003/0198322 A1 | 10/2003 | White, Jr. |
| 2003/0219107 A1 | 11/2003 | Richardson et al. |
| 2004/0049545 A1 | 3/2004 | Lockridge et al. |
| 2004/0101118 A1 | 5/2004 | Powell |
| 2004/0101124 A1 | 5/2004 | Koch et al. |
| 2004/0109558 A1 | 6/2004 | Koch |
| 2004/0114730 A1 | 6/2004 | Koch et al. |
| 2004/0120475 A1 | 6/2004 | Bauer et al. |
| 2004/0125929 A1 | 7/2004 | Pope ..................... 379/142.17 |
| 2004/0171370 A1 | 9/2004 | Natarajan |
| 2004/0181587 A1 | 9/2004 | Cao et al. |
| 2004/0202298 A1 | 10/2004 | Lopez et al. |
| 2004/0202299 A1 | 10/2004 | Schwartz |
| 2004/0208301 A1 | 10/2004 | Urban et al. |
| 2004/0208302 A1 | 10/2004 | Urban et al. |
| 2004/0209604 A1 | 10/2004 | Urban et al. |

| | | | |
|---|---|---|---|
| 2004/0209605 A1 | 10/2004 | Urban et al. | |
| 2004/0209640 A1 | 10/2004 | Urban et al. | |
| 2004/0233892 A1 | 11/2004 | Roberts et al. | |
| 2004/0242212 A1 | 12/2004 | Bacon et al. | |
| 2004/0248560 A1 | 12/2004 | Bedingfield, Sr. | |
| 2005/0073999 A1 | 4/2005 | Koch | |
| 2005/0100158 A1 | 5/2005 | Kreiner et al. | |
| 2005/0107074 A1 | 5/2005 | Zellner | |
| 2005/0147228 A1 | 7/2005 | Perrella et al. | |
| 2006/0002540 A1 | 1/2006 | Kreiner et al. | |
| 2006/0013375 A1 | 1/2006 | Smith et al. | |
| 2006/0029209 A1 | 2/2006 | Moton et al. | |
| 2006/0152207 A1 | 7/2006 | Riebel et al. | |
| 2007/0064911 A1 | 3/2007 | Bedingfield, Sr. et al. | |

FOREIGN PATENT DOCUMENTS

| | | |
|---|---|---|
| KR | 2002014945 | 2/2002 |
| WO | WO 97/50225 | 12/1997 |
| WO | 03/030501 A1 | 4/2003 |
| WO | 03/030502 A1 | 4/2003 |
| WO | 03/090432 A1 | 10/2003 |

OTHER PUBLICATIONS

U.S. Official Action dated Dec. 28, 2004 cited in U.S. Appl. No. 09/888,926.

Mize, Gary, Patent Pend. Projected Caller ID Own 50% Look [online], Sep. 10, 2000 [retrieved on Sep. 20, 2000].

Copending U.S. Appl. No. 09/888,832, filed Jun. 25, 2001, entitled "Visual Caller Identification".

U.S. Official Action dated Sep. 9, 2004 cited in U.S. Appl. No. 09/888,832.

Michael W. Slawson, "Caller ID Basics", http://www.testmark.com/develop/tml_callerid¯ent.html, Oct. 31, 2001, 10 pages.

"Talking Caller ID" by Stealth Software, http://www.talkingcallerid.com/, Aug. 31, 2005, 5 pages.

Aastra (quick links), http://www.aastra.com/products/callerids/voicecallerid/bc-6060.html, Aug. 31, 2005, 2 pages.

Aastra (quick links), CNX Audio Conference Bridge, http://www.aastra.com/products/callerids/voicecallerid/bc-9090.html, Aug. 31, 2005, 2 pages.

Smarthome, The Caller ID System That Speaks for Itself!, http://www.smarthome.com/5154.html, Aug. 31, 2005, 2 pages.

"Multi-Lingual Text-to-Speech Processor ML2110<", http://www.oki.eom/semi/english/m12110/html, Aug. 31, 2005, 5 pages.

Y. Rekhter et al., "Address Allocation for Private Internets," RFC1918, Silicon Graphics, Inc., Feb. 1996, 8 pages.

K. Egevang et al., "The IP Network Address Translator (NAT)," RFC1631, NTT, May 1994, 8 pages.

M. Handley et al., "SIP: Session Initiation Protocol," RFC2543, Bell Labs, Mar. 1999, 112 pages.

Vanessa, thank you so very much for helping me forward this information on to some great people.

AASTRA Telecom, Press Release, Aastra Telecom Introduces CNX Conference Bridge, Aug. 29, 2005, 1 page.

Bellcore Specification TR-NWT-000310, Calling Number Delivery, Issue 4, Dec. 1992.

Bellcore Specification TR-NWT-001188, Calling Name Delivery Generic Requirements, Issue 1, Dec. 1991.

T. Farley et al.; "Cellular Telephone Basics: AMPS & Beyond;" [online]; [retrieved on Mar. 6, 2003]; retrieved from the Internet http://www.privateline.com/Cellbasics/Cellbasics.html.

J. Boswell, G. Lingenauber, An Advanced HF Receiver Design, Jul. 1994, IEE, Conference Publication. No. 392, pp. 41-47.

Mark H. Norris, Transmitter Architectures, 1998, IEE, pp. 4/1-4/6.

SmartHome "The Caller ID System that SPEAKS of Itself! Talking Caller ID;" [online]; [retrieved on Nov. 5, 2001]; retrieved from the Internet http://www.smarthome.com/5154.html.

"Time Division Multiple Access (TDMA);" [online]; [retrieved on Mar. 6, 2003]; retrieved from the Internet http://www.iec.org/online/tutorials/tdma/.

International Search Report PCT/US02/30068, Dec. 9, 2002.

International Search Report PCT/US02/29988, Sep. 23, 2002.

U.S. Appl. No. 10/032,724, filed Dec. 27, 2001, Harold et al. (BLL-0454).

U.S. Appl. No. 10/200,906, filed Jul. 23, 2002, Scott et al. (BLL-0447).

U.S. Appl. No. 10/144,556, filed May 13, 2002, Koch et al. (BLL-0449).

U.S. Appl. No. 10/144,556, filed May 13, 2002, Koch et al. (BLL-0448).

U.S. Appl. No. 10/152,544, filed May 21, 2002, Alston et al. (BLL-0455).

U.S. Appl. No. 10/200,874, filed Jul. 23, 2002, Scott et al. (BLL-0451).

U.S. Appl. No. 09/812,338, filed Mar. 19, 2001, Smith (BLL-0035).

Partridge, H1714, Mar. 3, 1998.

* cited by examiner

AUDIO CALLER IDENTIFICATION

CROSS-REFERENCE TO RELATED APPLICATIONS

This patent application is a continuation of U.S. patent application Ser. No. 09/888,926, entitled "AUDIO CALLER IDENTIFICATION," filed Jun. 25, 2001 now U.S. Pat. No. 7,012,999 and assigned to the same assignee as this application. The aforementioned patent application is expressly incorporated herein by reference.

TECHNICAL FIELD

This invention generally relates to telephony-based caller identification systems and methods, and more particularly, relates to a system and method for providing audio caller identification.

BACKGROUND OF THE INVENTION

In recent years a growing number of telephone services have become available to users of telephone services. Such services include, for example, call forwarding, call waiting, conferencing, and caller identification.

Caller identification, or Caller ID, has become particularly popular as it allows called parties a certain degree of call screening prior to answering a call. In a typical case, the called party's telephone has a caller ID screen or a stand-alone attached caller ID device. When the called party receives a call, caller identification information on the calling party, including the date and time of the call, and often the name and number of the calling party, is displayed on the screen of the called party's caller ID device.

Typically, the called party receives the call, and the called party must rush to the telephone to determine who is calling by reading the caller ID screen on the called party's caller ID device. Most often, one of three caller identifications is provided to the called party. One, the identification is a name and/or number known to the caller, for example, a friend, family member, or associate. Two, the identification is a name and/or number unknown to the called party, or three, no name or number is provided, and the screen reads "private," "unlisted," "out of area," or the like. For called parties who are seeing impaired, the problem is greater because they are unable to read the caller ID information from a standard caller ID equipped telephone or standalone caller ID device.

It is with respect to these considerations and others that the present invention has been made.

SUMMARY OF THE INVENTION

In accordance with the present invention, the above and other problems are solved by an audio caller identification system and method. A caller identification device of a called party's telephone, whether integrated with the telephone or stand-alone, includes a speaker for audibly alerting the called party to the nature of an incoming call. A speech synthesizer in concert with an audio caller ID program may audibly identify a name and/or number of the calling party displayed on the called party's caller ID device, including descriptive terms for calling parties such as "private," "unlisted," or "out of the area." When the telephone begins to ring, the called party may listen to the audio identification of the calling party for a quick screening without having to go to the telephone to read the caller ID.

According to another aspect of the invention, the called party may save into memory a number of pre-recorded messages associated with known telephone numbers. When the called party's telephone rings, a comparison is performed of the calling party number with numbers associated with the stored pre-recorded messages. The comparison is performed by the caller identification device when it receives caller identification information on the calling party for display. If the telephone number of the calling party matches a number associated with one of the pre-recorded messages, the pre-recorded message is played to the called party along with a display of the caller identification information.

Alternatively, the audio message may be synthesized and presented to a called party by network software of a telephone network in which the called party's caller identification device operates. Likewise, pre-recorded messages and subsequent comparison of calling party numbers to numbers associated with pre-recorded messages may be performed by network software.

These and other features and advantages, which characterize the present invention, will be apparent from a reading of the following detailed description and a review of the associated drawings. It is to be understood that both the foregoing general description and the following detailed description are exemplary and explanatory only and are not restrictive of the invention, as claimed.

DETAILED DESCRIPTION OF THE INVENTION

Figure 1:
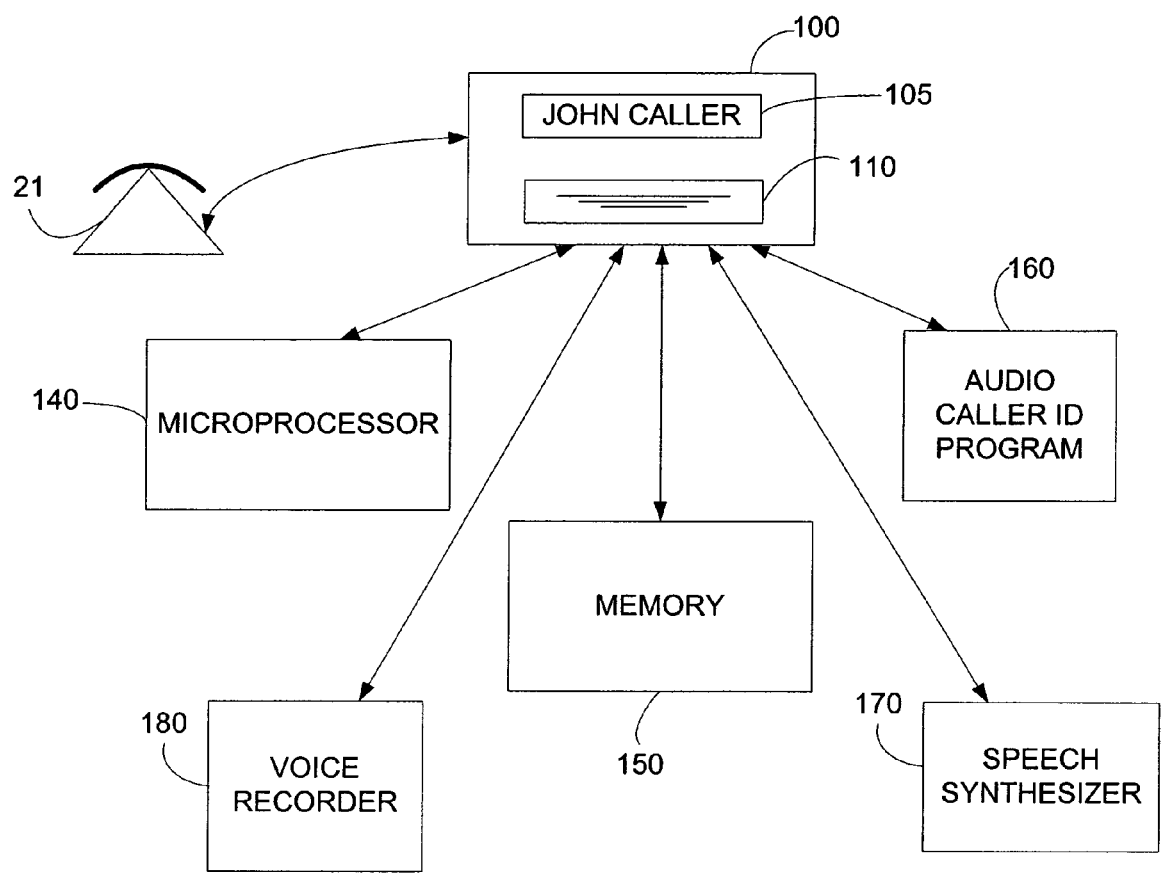
FIG. 1 is a block diagram illustrating the system architecture of an exemplary embodiment of the present invention.

In accordance with an exemplary embodiment of the present invention, an audio caller identification system and method are provided. The caller ID device, whether integrated with the telephone or stand-alone, includes a speaker for audibly alerting the called party to the nature of an incoming call. A speech synthesizer or pre-recorded message in concert with an audio caller ID program audibly identifies a name and/or number of the calling party displayed on the called party's caller ID device. The functionality of the present invention is particularly useful for seeing impaired parties who may use audio caller identification to alert them to the call and to provide them useful information as to the nature of the call. Referring now to the drawings, in which like numerals represent like elements throughout the several figures, aspects of the present invention will be described.

Caller ID is well known to those skilled in the art as a system and method for displaying to called parties information about a calling party. In the typical setting, a user of caller ID has a caller identification screen integrated with her telephone set or integrated into a caller ID box connected to a telephone set as a stand alone unit. Caller identification information may be transmitted to the called party for presentation on her caller ID device using a variety of known methods. One known method uses frequency shift keyed (FSK) modem tones. The FSK modem tones are used to transmit the display message in standard ASCII character code form, and typically the transmission of the display message takes place between the first and second ring of the user's telephone set. The information sent to the user most often includes the calling number and the date and time of the call. In some situations, the name of the calling party is also included.

FIG. 1 is a block diagram illustrating the system architecture of an exemplary embodiment of the present invention. As shown in FIG. 1, a telephone set 21 is provided, and connected to the telephone set 21 is a caller identification box 100. Alternatively, the caller identification functionality of the caller ID box 100 may be integrated with the telephone set 21. The caller ID box 100 includes a display screen 105 for display of caller identification information, such as the name, number, date, time, etc., for an incoming telephone call. According to a preferred embodiment, the caller ID box 100 includes a speaker 110 for audibly identifying incoming telephone calls as described above.

Also illustrated in FIG. 1 are a microprocessor 140, memory 150, an audio caller ID program 160, a speech synthesizer 170, and a voice recorder 180. According to an exemplary embodiment, the microprocessor 140 is resident in the caller ID box 100 for processing information coming into the caller ID box 100 as well as accepting and processing instructions contained in the audio caller ID program 160. The speech synthesizer 170 is a software module and hardware component for producing spoken words using well-known techniques such as splicing together pre-recorded words or by stringing together sounds that make up words. The voice recorder is a well-known recorder/player for recording and playing back on demand spoken words and sounds. According to one embodiment of the present invention, the user of the caller ID box 100 may enter into memory 150, through the telephone keypad of the telephone set 21 and through the voice recorder 180, a list of telephone numbers and associated pre-recorded messages for known parties, such as friends, family members, associates or anyone for whom the user would like to be notified of as a known caller by the audio caller identification system of the present invention.

When the user of the caller ID box 100 receives a call on her telephone set 21, the microprocessor 140 calls on the functionality of the audio caller ID program 160 to provide audio caller identification for the user as the called party. According to a preferred embodiment, the audio caller ID program 160 receives the caller identification information, such as the name and telephone number of the calling party. The audio caller ID program 160 calls on the functionality of the speech synthesizer 170 and the name of the calling party is passed to the speech synthesizer 170 for translation into spoken words. The caller identification information is displayed on the display screen 105. After a prescribed number of rings, the telephone ring is suspended and the speech synthesizer 170 via the audio caller ID program 160 and the microprocessor 140 provides an audio version of the name provided as part of the caller identification information. The number of rings provided before the audio caller ID information is provided may be set by the user/called party.

For example, if the caller identification information reads "John Caller," the speech synthesizer 170 will generate an audio version of the name, and the spoken words "John Caller" will be played through the speaker 110. If the caller identification information for the calling party is not available or is blocked, an audio message such as "private," "unlisted," or "out of the area" may be presented in audio form via the speaker 110. In short, any information displayed on the display 105 may be synthesized into audio form by the speech synthesizer 170, as programmed by the user. That is, the audio caller ID program 160 may be programmed to send a telephone number to the speech synthesizer when the name of the calling party is not identified.

Alternatively, the user of the caller ID box 100 may pre-record messages into memory 150 for play in association with known telephone numbers. The user may type into the keypad of the telephone set 21 numbers of known parties, for example, friends, family members, associates, etc., and then the user may record using the voice recorder 180 a message associated with a given number. For example, the user may type in the number of his associate, "John", and record a message such as "Pick up the phone—John is calling." According to this alternative embodiment, when caller identification information is sent to the called party, the audio caller ID program 160 queries the memory 150 for a pre-recorded message associated with the number. If a match is found the audio caller ID program 160 via the microprocessor 140 causes the voice recorder to play the pre-recorded message over the speaker 110. The caller identification information is displayed on the display screen 105, as described above. If no matching pre-recorded message is located in memory 150 for the telephone number of the calling party, the speech synthesizer 170 synthesizes the name or other identification provided with the caller identification information, as described above.

According to another embodiment, the functionality of both embodiments described above may be maintained and provided by network software and hardware, described below, and the audio caller identification may be provided by network elements to the called party at the called party's telephone 21.

Figure 2:
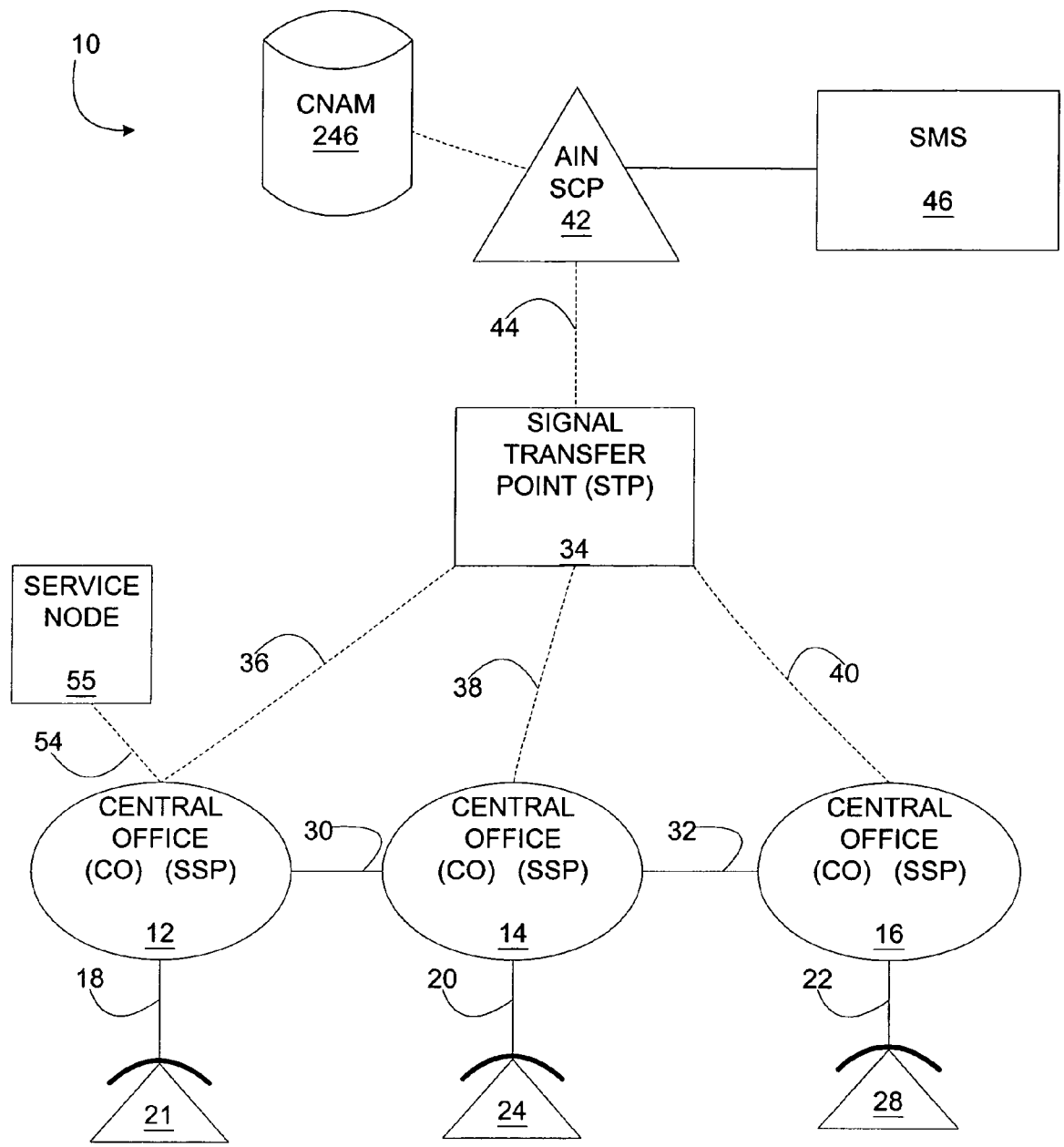
FIG. 2 illustrates a telephone network that provides an exemplary operating environment of the present invention.

FIG. 2 is a block diagram illustrating an exemplary operating environment for an embodiment of the present invention and includes a general description of a modem public switch telephone network through which the present invention preferably operates. The modem public switched telephone network (PSTN) has separate signaling paths for voice signals (or other customer-utilized communication circuits) and for control signals, which include information transmitted throughout the network to control the connection and disconnection of the voice circuits. In the late 1970s and early 1980s, American Telephone & Telegraph Company (AT&T) developed an early species of common channel interoffice signaling (CCIS). CCIS is essentially a network architecture for a switched telephone network in which information about a telephone call is transmitted over high speed data links that are separate from the voice circuits that are used to transmit the signals of the call itself.

The public switched telephone network that evolved in the 1980s incorporated the advanced intelligent network (AIN). Some of the components of the advanced intelligent network are illustrated in FIG. 2. FIG. 2 is a block diagram representing at least a part of the advanced intelligent network (AIN) 10 of a typical local exchange carrier. The advanced intelligent network (AIN) uses the signaling system 7 (SS7) network for signal or system control message transport. The components thereof are well known to those skilled in the art. The operation of many of the components of the advanced intelligent network is also described in U.S. Pat. No. 5,245,719 to Weisser entitled "Mediation of Open Advanced Intelligent Network Interface by Shared Execution Environment" which is incorporated herein by reference. The SS7 communications protocol is provided in the document entitled "Bell Communications Research Specification of Signaling System 7," Document TR-NWT-000246, Issue 2 (June 1991), plus Revision 1 (December 1991), which is also incorporated herein by reference.

A plurality of central offices is provided in a typical public switched telephone network. As shown in FIG. 2, each central office may include an electronic switch known to those skilled in the art as a service switching point (SSP). These are indicated in FIG. 1 as SSP switches 12, 14, and 16. The number of SSP switches depends on the number of subscribers to be served by the public switched telephone network. An SSP is the AIN component of a typical electronic central office switch used by a local exchange carrier. The terms "SSP" and "switch" are used interchangeably hereinafter and are understood to refer to a telecommunications switch having AIN capability and which may be utilized for connecting voice channel circuits, including voice channel lines, such as trunk circuits 30 and 32.

As shown in FIG. 2, central offices switches (SSP) 12, 14, and 16 have a plurality of subscriber lines 18, 20, and 22 connected thereto. Each of the subscriber lines 18, 20, and 22 is connected to a terminating piece or pieces of customer premises equipment that are represented by pay telephone 21 and standard telephone sets 24 and 28. SSP switches 12, 14, and 16 are connected by a plurality of trunk circuits indicated as 30 and 32 in FIG. 2. These are the voice path trunks that interconnect the central offices 12, 14, and 16 and over which calls are connected when completed.

Each piece of terminating equipment in the PSTN is preferably assigned a directory number. The term "directory number" is used herein in a manner consistent with its generally understood meaning of a number that is dialed or input by an originating party at an originating station to reach a terminating station associated with the directory number. A directory number, typically a ten digit number, is commonly referred to as a "telephone number" and may be assigned to a specific telephone line, such as the telephone line 18 shown in FIG. 2.

Much of the intelligence, and the basis for many of the enhanced features of the network, resides in the local AIN service control point (SCP) 42 that is connected to signal transfer point 34 via SS7 data link 44. As is known to those skilled in the art, AIN service control points, such as AIN SCP 42, are physically implemented by relatively powerful fault tolerant computers. Among the functions performed by the service control points is maintenance of network databases used in providing enhanced services. The AIN SCP 42 is also connected to a caller ID with name (CNAM) database 246. The CNAM database comprises a plurality of directory numbers along with associated names for the directory numbers. The CNAM database may be used to provide a look-up database to provide caller ID service. According to an alternate embodiment of the present invention, caller identification information stored into memory 150 by the called party, may be stored in the AIN SCP 42 or in the CNAM database 246 or other AIN data storage device accessible by the SCP 42 for provision to the caller ID box 100 of the present invention.

The modern Advanced Intelligent Network 10 also includes service nodes (SN) such as service node 55 shown in FIG. 2. Those skilled in the art are familiar with service circuit nodes, which are physically implemented by the same types of computers that embody the SCP 42. In addition to the computing capability and data base maintenance features, service nodes 55 use ISDN lines and may include DTMF signal recognition devices, tone generation devices, voice synthesis devices and other voice or data resources. As shown in FIG. 2, the connection is through the SSP. For example SCN 55 is connected to SCP 42 via ISDN links 54 to SSP 12, ISDN/SS7 protocol conversion in SSP 12, and SS7 links 36 and 44. It is understood that the service node 55 may also be connected to a service management system, but such connection is not shown in FIG. 2. While service nodes 55 are physically quite similar to the SCP 42, there are some important differences in the uses to which they are put.

Service control points, such as SCP 42, normally implement high volume routing services, such as call forwarding and 800 number translation and routing. They are also used for maintenance of and providing access to high volume databases for authorization of billing, such as credit card number validations. In most local exchange carrier networks, service control points are only used for data base look up and routing services that take place prior to the logical completion of the call, i.e., the provision of a ringing signal to the called subscriber line and ring back to the calling subscriber. By contrast, service nodes, such as service node 55, are used principally when some custom feature or service is needed that requires an audio connection to the call or transfer of a significant amount of data to a subscriber over a switched connection during or following a call. As shown in FIG. 2, service circuit nodes 55 are typically connected to one or more (but normally only a few) SSP central office switches via Integrated Service Digital Network (ISDN) links shown as line 54. Thus, services that are implemented during a call (i.e., after completion of ringing or called subscriber pick up) employ the facility of a service node.

In operation, the intelligent network elements of the AIN 10, as described above, communicate with each other via digital data messages transmitted over the network of digital data links. An SSP may be configured to interface with these network elements through the use of a trigger. A trigger in the network is an event associated with a particular subscriber line or call that causes the SSP to generate a data packet message to be sent to a service control point. In order to keep the processing of data and calls as simple and generic as possible at central office switches, such as SSP central office switches 12, 14, and 16, a relatively small set of triggers are defined at the SSP central office switches for each call.

The message created by an SSP 12 in response to a trigger is known as a "query" message. A query message opens a "transaction" and the SSP generally holds the communication until it receives a reply from an appropriate network element via the network of digital data links instructing the SSP 12 to take a certain action. If the SSP 12 receives no instructions within a certain amount of time, the SSP "times-out" and executes a default task for the communication. The reply to the query message may be a "conversation" message or a "response" message. Conversation messages allow for bi-directional exchanges between network elements while the transaction remains open. A "response" message closes the transaction opened by the query message, and usually instructs the SSP 12 to route the held communication for connection with a terminating station. Query messages, conversation messages, and response messages are standard types of messages defined by the AIN protocol. The details of the AIN protocol are known to those skilled in the art and will not be further described herein. For more information regarding the AIN protocol, see Bellcore Specification GR-1298-CORE Switching Systems Generic Requirements for AIN 0.1, which is incorporated herein by reference.

Figure 3:
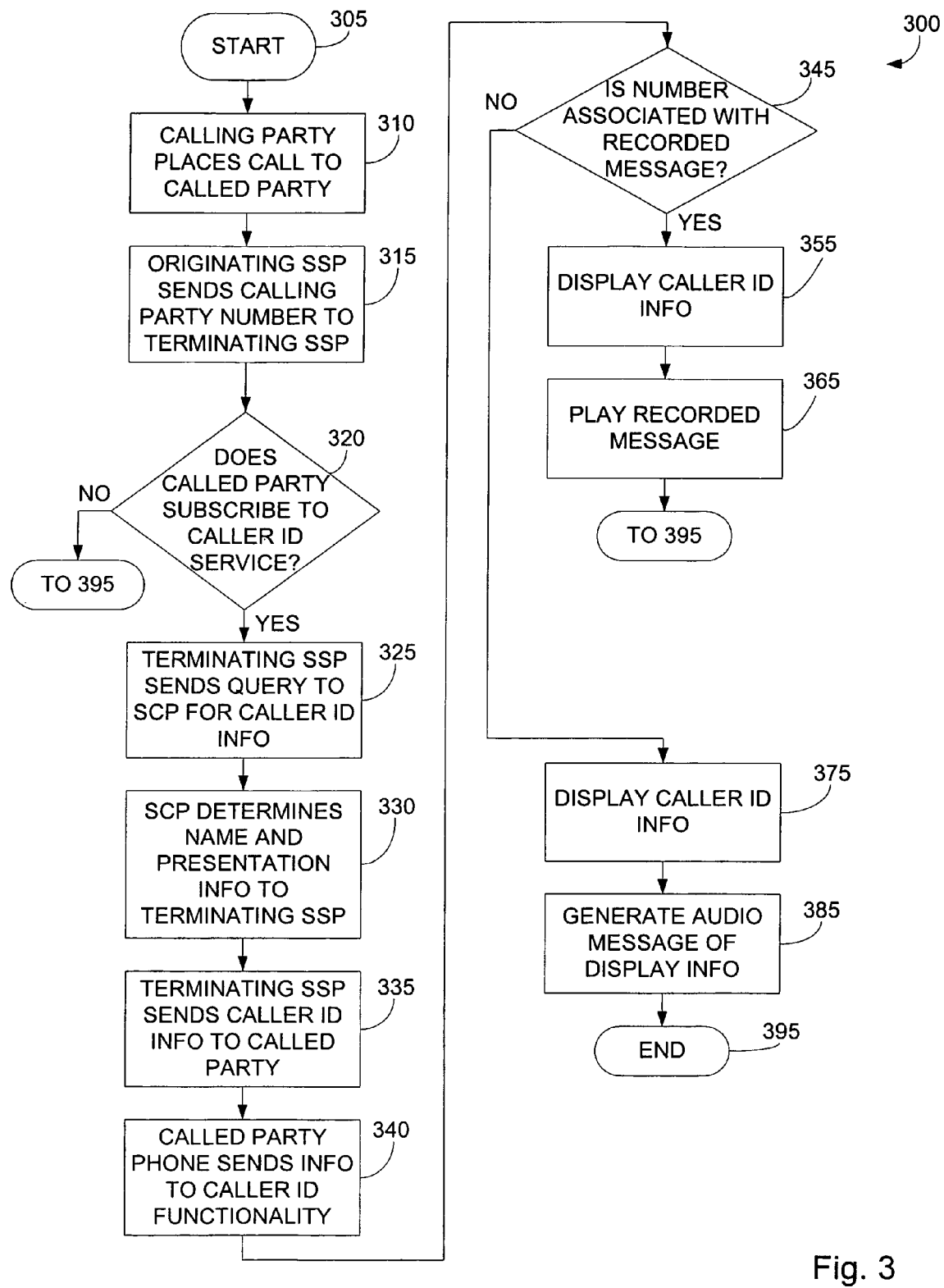
FIG. 3 illustrates an operational flow of the steps performed by the system and method of the present invention in providing audio caller identification.

Having described an exemplary operating environment above in reference to FIG. 2, a flow diagram illustrating a method 300 for providing audio caller identification service to a user of caller ID services in accordance with an embodiment of the present invention will be described with reference to FIGS. 1, 2 and 3. For purposes of the exemplary call flow, assume the called party has programmed into memory 150 telephone numbers of certain calling parties for whom the called party wishes to receive audio caller identification.

The method 300 begins at start step 305 and moves to step 310 where a calling party using a telephone set 24 places a call to a called party at telephone set 21, where the called party has subscribed to caller ID services. At step 315, the originating central office switch 14 attempts to set up a call between the telephone set 24 of the calling party and the telephone set 21 of the called party by signaling the terminating switch 12 of the called party.

At step 320, the terminating switch 12 receives the call set up message from the originating switch 14, and the terminating switch 12 sends a message to the AIN SCP 42 to determine call services, including caller ID, to which the called party has subscribed. If the called party at telephone set 21 has not subscribed to caller ID services, the method follows the "No" branch to step 395 and ends.

If the called party has subscribed to caller ID services, the method follows the "Yes" branch to step 325, and the terminating switch 12 sends a query to the SCP 42 for caller identification information, if any, associated with the telephone number of the calling party. At step 330, the SCP queries the CNAN database 246 for caller identification information, if any, associated with the telephone number of the calling party. As will be appreciated by those skilled in the art, the SCP may also query other SCP's or other databases to obtain caller identification information, if any, associated with the calling party. If the SCP 42 locates caller identification information associated with the telephone number of the calling party, the SCP 42 forwards the caller identification information to the terminating switch 12. If, however, the telephone number of the calling party is marked as private or unlisted, or if the SCP 42 is unable to locate caller identification information associated with the telephone number of the calling party, a message will be forwarded to the terminating switch 12 that the telephone number of the calling party is private, unlisted, or unavailable.

At step 335, the terminating central office switch 12 of the called party attempts to connect a call from the calling party by providing a ring at the telephone set 21. Along with the ring provision, the central office switch 12 provides the caller identification information to the telephone set 21, and at step 340, the caller identification information is sent to the caller ID box 100, illustrated in FIG. 1.

At step 345, the audio caller ID program 160, at the direction of a microprocessor 140, receives the caller identification information and queries memory 150 to determine whether the telephone number of the calling party is associated with a message pre-recorded by the called party. If yes, the method follows the "YES" branch to step 355. At step 355, the microprocessor 140 displays the caller identification information sent to the caller ID box 100. At step 365, the pre-recorded message associated with the telephone number of the calling party is played to the called party by the voice recorder 180 via the speaker 110. According to an exemplary embodiment, the ringing of the telephone set 21 is suspended after a number of rings, prescribed by the called party, and the message is played. For example, if the telephone number of the calling party is associated with the called party's friend, John, the message may read "Pick up the phone—John is calling." After the message is played at step 365, the method ends at step 395.

If at step 345 the telephone number of the calling party does not match one of the pre-recorded messages, the method follows the "NO" branch to step 375, and the caller identification information for the calling party is displayed on the screen 105. At step 385, the name of the calling party or other identifier, such as "private," "unlisted," "out of the area," or the like, is sent to the speech synthesizer 170 for generation of an audio presentation of the name or other identifier to the user via the speaker 110. After the synthesized message is played to the called party via the speaker 110, the method ends at step 395. According to an alternative embodiment, the audio caller ID program 160 may be programmed to speech synthesize the telephone number of the calling party if that information is provided, but the name of the calling party is not available.

According to another embodiment, the pre-recorded messages may be recorded, stored and replayed over the speaker 105 from a network-based component, such as the service node (SN) 55, described above. In that case the SCP 42 may query a database of telephone numbers associated with pre-recorded messages recorded by the called party. The database of telephone numbers may be maintained at a number of network-based databases, including databases maintained at the SCP, SN, CNAM, etc. If a match is found at step 345, according to this embodiment, the pre-recorded message played at step 365 is played by the SN 55 to the called party via the switch 12. The SN 55 may also provide speech synthesis of caller identification information that is then provided to the called party via the switch 12.

According to another embodiment, the calling party may be permitted to record a message for play to the called party by the SN 55 if the called party permits the playing of messages from calling parties. For example, the calling party upon prompting may record the message, "Hi this is you Mom calling," and that message will be stored by the network for play to the called party by a network component, such as the SN 55. Then, after the SCP retrieves caller identification information for the calling party, as described above, the SCP 42 may direct the SN 55 to provide the recorded message of the calling party to the called party while caller identification information is sent to the called party's telephone 21 and caller ID box 100, as described above.

As described herein, a system and method are provided for presenting audio caller identification information to a called party to allow the called party to screen incoming telephone calls without the need for the called party to interrupt her activities in order to read the caller identification information provided on her caller identification device. It will be apparent to those skilled in the art that various modifications or variations can be made in the present invention without departing from the scope or spirit of the invention. Other embodiments of the invention will be apparent to those skilled in the art from consideration of the specification and practice of the invention disclosed herein.

I claim:

1. A method of providing audio caller identification, comprising:

receiving a call, the call being associated with a directory number;

querying a database for caller identification information associated with the call;

sending the caller identification information to a caller identification device; and synthesizing and playing to the called party an audio message related to the caller identification information associated with the call, and displaying the caller identification information associated with the call;

wherein synthesizing includes determining if the caller identification information associated with the call matches the caller identification information associated with a pre-recorded audio message;

if the caller identification information associated with the call matches the caller identification information associated with the pre-recorded audio message, then sending the pre-recorded audio message to the called party identification device causing the called party identification device to play the pre-recorded audio message and contemporaneously display the caller identification information associated with the call; and if the caller identification information associated with the call does not match the caller identification information associated with the pre-recorded audio message, then synthesizing an audio message to the caller identification information associated with the call and causing the called party caller identification device to play the audio message and contemporaneously display the caller identification information associated with the call.

2. The method of claim 1, further comprising:

prior to the step of synthesizing and playing an audio message, saving a recorded audio message associated with a directory number;

comparing the directory number associated with the call with the directory number associated with the recorded audio message;

when the directory number associated with the call matches the directory number associated with the recorded audio message, playing the recorded audio message and displaying the caller identification information associated with the call; and when the directory number associated with the call does not match the directory number associated with the recorded audio message, then synthesizing and playing the audio message related to the caller identification information associated with the call, and displaying the caller identification information associated with the call.

3. The method of claim 2, further comprising:

wherein sending the caller identification information to a caller identification device includes ringing a telephone to which the caller identification device is functionally connected;

wherein playing the recorded audio message and displaying the caller identification information associated with the call includes suspending ringing the telephone while playing the recorded audio message; and wherein playing an audio message related to the caller identification information associated with the call includes suspending ringing the telephone while playing the recorded audio message.

4. The method of claim 2, wherein playing the recorded audio message and displaying the caller identification information associated with the call and playing the audio message related to the caller identification information associated with the call include playing the recorded audio message and playing the audio message related to the caller identification information over a speaker functionally connected to the caller identification device.

5. The method of claim 1, wherein synthesizing and playing an audio message related to the caller identification information associated with the call comprises speech translating and playing the directory number into spoken words when a name of a calling party is not provided.

6. The method of claim 5, wherein synthesizing and playing an audio message related to the caller identification information associated with the call comprises generating and playing an audio version of the name of the calling party into spoken words when the name is provided.

7. The method of claim 1, wherein synthesizing and playing an audio message related to the caller identification information associated with the call comprises speech translating and playing a descriptive term for a calling party into spoken words, the descriptive term displayed and comprising at least one of the following:

"private";

"unlisted"; and

"out of the area".

8. The method of claim 1, wherein a number of rings provided before the caller identification information is provided is set by the called party.

9. A software product comprising control logic stored therein for causing a audio caller identification system to provide audio caller identification, the control logic comprising software program code for causing the audio caller identification system to:

receive a call from a calling party at a calling party switch directed to a called party at a called party switch;

send call information associated with the call, the call information including the directory number of the calling party;

query a the database of caller identification information for caller identification information associated with the call;

synthesize and send an audio message related to the caller identification information associated with the call to a called party caller identification device via the called party switch;

wherein synthesizing includes determining if the caller identification information associated with the call matches the caller identification information associated with a pre-recorded audio message;

if the caller identification information associated with the call matches the caller identification information associated with a pre-recorded audio message, then sending the pre-recorded audio message to the called party identification device causing the called party identification device to play the pre-recorded audio message and contemporaneously display the caller identification information associated with the call; and if the caller identification information associated with the call does not match the caller identification information associated with the pre-recorded audio message, then synthesizing an audio message related to the caller identification information associated with the call and causing the called party caller identification device to play the audio message and contemporaneously display the caller identification associated with the call.

10. The software product of claim 9, further comprising software program code for causing the audio caller identification system to:

prior to synthesizing and sending an audio message, save a recorded audio message associated with a directory number;

compare the directory number associated with the call with the directory number associated with the recorded audio message;

if the directory number associated with the call matches the directory number associated with the recorded audio message, send the recorded audio message to a called party caller identification device via the called party switch;

at the called party caller identification device, play the recorded audio message and displaying the caller identification information associated with the call; and if the directory number associated with the call does not match the directory number associated with the recorded audio message, then synthesize and send an audio message related to the caller identification information associated with the call to a called party caller identification device via the called party switch.

11. The software product of claim 10, further comprising software program code for causing the audio caller identification system to:

after receiving a call from a calling party at a calling party switch directed to a called party at a called party switch, receive a recorded audio message from the calling party directed to the called party;

send the recorded audio message from the calling party to a called party caller identification device via the called party switch;

at the called party caller identification device, play the recorded audio message from the calling party and display the caller identification information associated with the call; and if no recorded audio message is received from the calling party directed to the called party, then:

if the directory number associated with the call matches the directory number associated with the recorded audio message, send the recorded audio message to a called party caller identification device via the called party switch;

at the called party caller identification device, play the recorded audio message and display the caller-identification information associated with the call; and if the directory number associated with the call does not match the directory number associated with the recorded audio message, then synthesize and send an audio message related to the caller identification information associated with the call to a called party caller identification device via the called party switch.

12. A system for providing audio caller identification, comprising:

means for querying a database for caller identification information associated with a call from a calling party to a called party, the call being associated with a directory number; and means for sending the caller identification information to a caller identification device;

the caller identification device, operative to:

receive the caller identification information;

synthesize and play to the called party an audio message related to the caller identification information associated with the call, wherein synthesizing includes determining if the caller identification information associated with the call matches the caller identification information associated with a pre-recorded audio message;

if the caller identification information associated with the call matches the caller identification information associated with a pre-recorded audio message, then sending the pre-recorded audio message to the called party identification device causing the called party identification device to play the pre-recorded audio message and contemporaneously display the caller identification information associated with the call; and if the caller identification information associated with the call does not match the caller identification information associated with the pre-recorded audio message, then synthesizing an audio message related to the caller identification information associated with the call and causing the called party caller identification device to play the audio message and contemporaneously display the caller identification information associated with the call.

13. The system of claim 12, wherein the caller identification device is further operative to:

to save a recorded audio message associated with a directory number prior to synthesizing and playing an audio message;

compare the directory number associated with the call with the directory number associated with the recorded audio message;

if the directory number associated with the call matches the directory number associated with the recorded audio message, play the recorded audio message and to display the caller identification information associated with the call; and if the directory number associated with the call does not match the directory number associated with the recorded audio message, then synthesize and play an audio message related to the caller identification information associated with the call, and display the caller identification information associated with the call.

14. A method of providing audio caller identification, comprising:

saving a recorded audio message associated with a directory number;

receiving a call, the call being associated with the directory number;

querying a database for caller identification information associated with the call;

sending the caller identification information to a caller identification device;

comparing the directory number associated with the call with the directory number associated with the recorded audio message;

if the directory number associated with the call matches the directory number associated with the recorded message, playing the recorded audio message and displaying the caller identification information associated with the call; and if the directory number associated with the call does not match the directory number associated with the recorded message, synthesizing and playing to a called party an audio message related to the caller identification information associated with the call, and displaying the caller identification information associated with the call.

* * * * *